8461X
J. W. COCHRAN.
Machine Gun.
Patented Oct. 22, 1834.
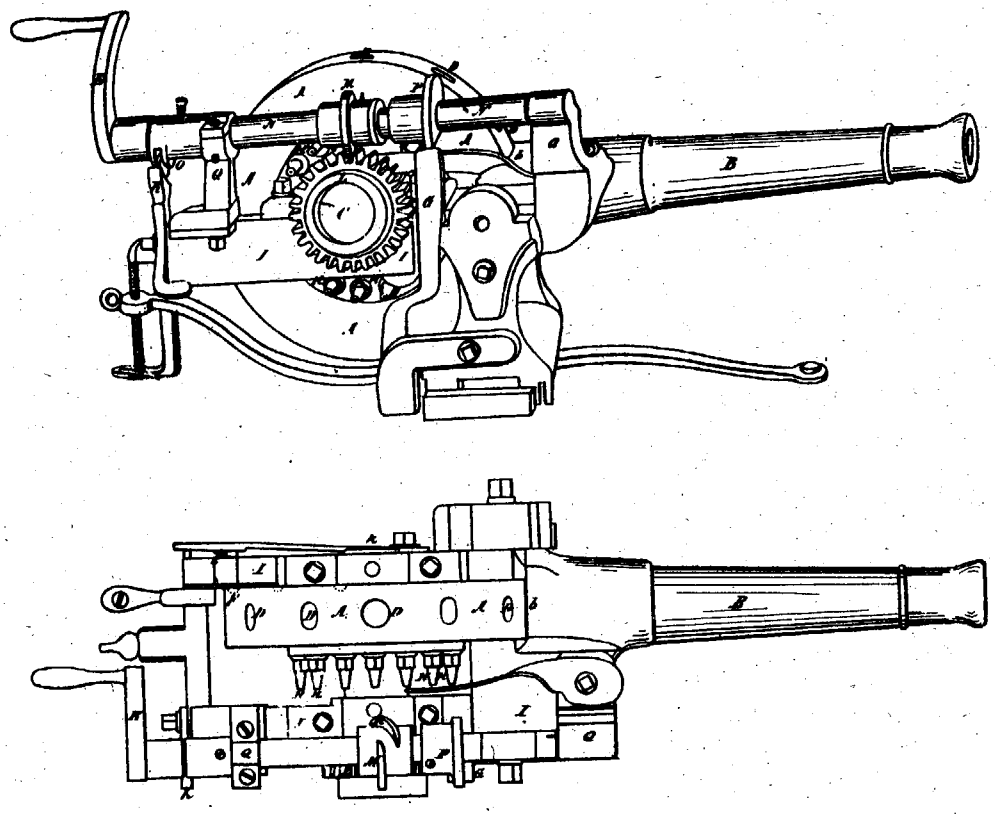

UNITED STATES PATENT OFFICE.

8461X

JOHN W. COCHRAN, OF LOWELL, MASSACHUSETTS.

IMPROVEMENT IN MANY-CHAMBERED CANNON.

Specification forming part of Letters Patent dated October 22, 1831.

*To all whom it may concern:*

Be it known that I, JOHN W. COCHRAN, of Lowell, in the county of Essex and State of Massachusetts, have invented an Improvement in the Construction of Cannon, which I call "Cochran's Many-Chambered Cannon," of which the following is a specification.

This applicant describes in the first place the construction of his improvement, so as to enable others skilled in the art to make the same.

A cannon of the construction, when made, apears as if a cannon of common construction were cut off about as far forward of the vent or bottom of the bore as the charge and ball usually fill when the gun is loaded, and a segment of a cylinder as thick as the exterior diameter of the section, having a diameter equal to about three times the length of the space usually occupied by the charge and ball in the gun, were placed closed to the cut end of the cannon, this cut end being shaped so that the periphery of the cylinder will apply thereto with precision—that is, when placed in close contact therewith; but this cylinder is suspended upon an axis passing through its center, so that the cylinder will revolve thereon freely as close as may be without actually touching said section of said cannon. In the periphery of this cylinder made in the direction of Radu chambers of conical form and of a depth equal to the space occupied in a cannon of the caliber to be constructed by the charge and ball. There may be twelve of these conical chambers, the bottom thereof being from half an inch to two inches, according to the caliber of the section of the cannon to which it is attached. The charges and balls are placed in these conical chambers as they are turned up successively in the revolving of the cylinder, and as the upper part of the cylinder is turned toward the section of the cannon these conical chambers are brought into the exact direction of the bore in the section of a cannon successively, and as they are so brought into direction the charge is fired from each chamber, and the balls pass through the bore of the gun and may be discharged upon their object in rapid succession and with the same precision in aim and by the usual means, as hereinafter described. The cylinder may be turned by a crank fixed to its axes, or by other convenient means, and on being brought into its proper position for firing, so that the conical chambers are in the direction of the bore of the gun, it may be stopped and fixed, and there by a pawl dropped or forced by a spring into a hole in the cylinder, near its periphery, to receive it. This pawl is disengaged by hand or by any convenient machinery when the cylinder is to revolve, so as to bring the next conical chamber into direction with the bore of the gun, and as soon and whenever these chambers are brought into such direction the trigger of the lock may be pulled by hand or started by mechanism moving it at the instant the chambers reach their said firing position, so that by turning a crank the cylinder may be discharged from the pawl and the chambers move to their position, respectively, and the lock-spring and the gun fired as these chambers come successively to the firing position, as aforesaid, nothing more needing to be done by hand but placing the cartridges or charge and balls in the chambers and fixing the caps upon the vents, these vents being made through one side of the cylinder into the chambers at a point half-way between the bottoms and the mouths thereof, and the caps fitting to the projecting tubes, as in common use in percussion-locks.

There is a frame cast with the section of a cannon. It consists of two sides connected by a cross-piece at right angles with them, at the end of the other ends of the side pieces being cast with the center of the cannon, embrace it in opposite sides about twelve inches or two feet, these frame-pieces being of the thickness of two-thirds of the diameter of the bore of the gun, and twice as deep or wide at the part where the axis of the cylinder is sustained, as hereinafter mentioned. In this frame are cast also the trunnions at the proper position in respect to the elevating of the gun in action, the section of the gun and the cylinder being both sustained on said trunnions. In these lateral pieces are made holes to receive the axes of the cylinder. These are to be at such a distance and in such a position as to bring the cylinder into its revolutions nearly in contact with the cut end of the gun, as aforesaid. It is thus apparent that the cylinder is suspended upon its axis in a frame cast with the cannon, making with the frame and the transverse section of a cannon the substitute intended for a cannon in common use.

This compound cannon may be mounted by its trunnions in a gun-carriage of any convenient structure, for use in batteries or in the field or on board of vessels of war. Its additional weight is not objectionable, because the cylinder may be separated when the gun is to be lifted, and thus removed separately, and when it is to be removed over a level surface the gun may be rolled along upon the cylinder, as on the deck of a vessel or the platform of a battery. In respect to the mechanism alluded to in the above description, this may be indefinitely various.

The movement of the cylinder may be effected by a crank upon the axis thereof; or a wheel with teeth therein may be placed upon that axis, and may be turned by a screw of appropriate obliquity fixed upon and turning with an arbor, above said arbor having a cam thereon at one end of it, which may be disengaged the pawl above mentioned, and another cam at the other end next the section of the gun, which may operate to spring the lock. Other similar modes of operation may also be used. This applicant has devised a mode which he describes as follows, viz: Upon the axes of the cylinder he places a wheel, with teeth thereon, and over it, and on one side of the cylinder and parallel with the bore of the gun, an arbor. This arbor is sustained at the muzzle end upon a standard resting on the frame, cast, as aforesaid, with the gun and firmly secured to it, said standard being so high that a box which contains the journal at this end of this arbor and the box in a standard of corresponding height at the extreme rear end of the frame will so sustain this arbor that the cut-worm screw on the arbor, hereinafter described, will take into the teeth of the wheel on the axis of the cylinder, as hereinafter described, and moves the wheel so as to carry the next chamber to the section of the gun. Upon the muzzle end of this arbor is a cam so shaped and proportioned as to withdraw the hammer of the lock for removal of the fragments of the percussion-cap and to allow space and time for placing the caps thereon when the conical chamber that is to be discharged shall arrive in place and thereto fire the cap by force of a spring disengaged from its catch, which is in effect a gun-lock. At the extremity of this arbor, which projects beyond the rear standard, is a crank, to be turned by hand, and at each revolution of the arbor a cam in the arbor, near the said rear standard, forces back one arm of a perpendicular lever, the other end of which takes into the spring attached to the pawl, and, forcing this outward, disengages the pawl. Then the cut-worm screw, also fixed around the arbor over the wheel on the axis of the cylinder, is turned, as follows: About two-thirds of this screw, projecting like the common form of a worm-screw, is exactly transverse to the axis of the arbor, so that this part of the screw runs through the teeth of the wheel while the cylinder is kept in its fast-firing position and until the pawl is disengaged, as aforesaid. Then the other part of this screw, being diagonal across the arbor and of sufficient length for this purpose, takes into teeth on the cylinder-axis, which are so cut diagonally that said diagonal parts of the worm-screw will pass through them and move the cylinder the required distance, certain other of the teeth being cut directly across the wheel, so that the direct transverse part of the screw will pass directly through them without moving the cylinder, as aforesaid.

This applicant in the next place describes the principle of his improvement, so as to distinguish the same from all others known and used before. It consists in the combination of a section of a cannon with many chambers formed in the segment of a cylinder, and capable of being brought successively to the direction of the bore in the section, and there firmly secured while the charges within said chambers are fired, substantially as aforesaid, the motion of the cylinder being effected by manual force or action or by mechanical power of any convenient structure. This combination, for which a patent is herein claimed, consisting essentially in the combination of several chambers constituted in a cylinder, substantially as aforesaid, with the section of a cannon constructed substantially as aforesaid. Whatever form of frame and mechanism for securing the position of the cylinder and releasing and moving it may be adopted, and whatever mode of firing the charge may be used, and whatever form and structure of frame to combine the chambers of the cylinder with the section of the cannon may be applied for, these may each be indefinitely varied, and yet the combination for which the patent is claimed be essentially and substantially the same.

This applicant, herein limiting the application of the principle of his invention to cannon, has devised various modes of applying the principles of his invention to such guns. The cylinder may be placed horizontally as well as vertically. The latter position is, however, preferable, because it occupies less horizontal space, and each charge being placed in the chamber, as these arrive successively to a vertical position, there will be no risk of its being displaced as the loaded chambers successively descend to the direction of the bore of the section.

JOHN W. COCHRAN.

Witnesses:
GEORGE SULLIVAN,
G. R. J. BOWDOIN.